(12) United States Patent
Bischoff et al.

(10) Patent No.: US 11,541,344 B2
(45) Date of Patent: Jan. 3, 2023

(54) LIGHTWEIGHT INORGANIC MEMBRANE MODULE

(71) Applicant: UT-BATTELLE, LLC, Oak Ridge, TN (US)

(72) Inventors: Brian L. Bischoff, Knoxville, TN (US); James William Klett, Knoxville, TN (US); Melanie Moses DeBusk, Knoxville, TN (US)

(73) Assignee: UT-BATTELLE, LLC, Oakridge, TN (US)

( * ) Notice: Subject to any disclaimer, the term of this patent is extended or adjusted under 35 U.S.C. 154(b) by 458 days.

(21) Appl. No.: 16/701,279

(22) Filed: Dec. 3, 2019

(65) Prior Publication Data

US 2020/0171422 A1 Jun. 4, 2020

Related U.S. Application Data

(60) Provisional application No. 62/774,371, filed on Dec. 3, 2018.

(51) Int. Cl.
*B01D 53/00* (2006.01)
*B01D 5/00* (2006.01)
*E03B 3/00* (2006.01)

(52) U.S. Cl.
CPC .......... *B01D 53/002* (2013.01); *B01D 5/009* (2013.01); *E03B 3/00* (2013.01); *B01D 2257/80* (2013.01); CPC ...... *B01D 2323/08* (2013.01); *B01D 2325/02* (2013.01)

(58) Field of Classification Search
None
See application file for complete search history.

(56) References Cited

U.S. PATENT DOCUMENTS 669,966 A 3/1901 Rose
3,830,705 A 8/1974 Dewegeli
(Continued)

FOREIGN PATENT DOCUMENTS

CN 103739029 B 5/2015
CN 106365235 A 2/2017
(Continued)

OTHER PUBLICATIONS

Translation of DE-102015005732-A1, accessed Jun. 29, 2022 (Year: 2015).*
(Continued)

*Primary Examiner* — Christopher P Jones
*Assistant Examiner* — Phillip Y Shao
(74) *Attorney, Agent, or Firm* — Fox Rothschild LLP

(57) ABSTRACT

An apparatus and system for separating a liquid from a mixed gas stream includes a porous graphite foam support comprising graphite foam with pores having a first pore size and a membrane support surface. A porous condensation membrane layer is provided on the membrane support surface, and interlocked with the pores of the graphite foam. The condensation membrane layer includes capillary condensation pores having a second pore size that is less than the first pore size. A mixed gas stream passageway is in fluid communication with the condensation membrane layer. A liquid collection assembly collects condensed liquid from the condensation pores and the graphite foam support pores. A gas inlet is provided for flowing the mixed gas stream into the mixed gas stream passageway. A gas outlet is provided for exhausting gas from the mixed gas stream passageway. A method for separating a liquid from a mixed gas stream is also disclosed.

13 Claims, 6 Drawing Sheets

(56) References Cited

U.S. PATENT DOCUMENTS

| | | | |
|---|---|---|---|
| 4,069,812 A | | 1/1978 | O'Neill |
| 4,119,083 A | | 10/1978 | Heyen et al. |
| 4,420,375 A | | 12/1983 | Husson |
| 4,725,359 A | * | 2/1988 | Ray .......................... C02F 1/16 210/640 |
| 6,033,506 A | | 3/2000 | Klett |
| 6,037,032 A | * | 3/2000 | Klett ....................... C09K 5/06 428/305.5 |
| 6,117,341 A | * | 9/2000 | Bray ..................... B01D 24/007 210/488 |
| 6,261,485 B1 | | 7/2001 | Klett |
| 6,287,375 B1 | | 9/2001 | Klett |
| 6,344,159 B1 | | 2/2002 | Klett |
| 6,355,144 B1 | | 3/2002 | Weinstein |
| 6,387,343 B1 | | 5/2002 | Klett |
| 6,398,994 B1 | | 6/2002 | Klett |
| 6,399,149 B1 | | 6/2002 | Klett et al. |
| 6,491,891 B1 | | 12/2002 | Klett et al. |
| 6,581,375 B2 | * | 6/2003 | Jagtoyen ............... F01N 3/2882 60/309 |
| 6,656,443 B2 | | 12/2003 | Klett |
| 6,673,328 B1 | | 1/2004 | Klett et al. |
| 6,767,433 B2 | | 7/2004 | Foster et al. |
| 6,780,505 B1 | | 8/2004 | Klett et al. |
| 6,855,744 B2 | | 2/2005 | Klett et al. |
| 6,875,247 B2 | * | 4/2005 | TeGrotenhuis ......... F28D 9/005 261/153 |
| 7,070,755 B2 | | 7/2006 | Klett et al. |
| 7,153,395 B2 | | 12/2006 | Foster et al. |
| 7,264,695 B2 | | 9/2007 | Foster et al. |
| 7,389,639 B2 | * | 6/2008 | Michalakos ........... B01D 53/86 60/309 |
| 7,456,131 B2 | | 11/2008 | Klett et al. |
| 7,484,626 B2 | * | 2/2009 | Judkins .............. B01D 67/0046 210/490 |
| 7,670,682 B2 | * | 3/2010 | Klett ................... C04B 38/0022 428/408 |
| 8,337,762 B2 | * | 12/2012 | Vakkilainen ............ F01N 3/281 422/177 |
| 8,511,072 B2 | | 8/2013 | Judkins et al. |
| 8,790,754 B1 | | 7/2014 | Rangan et al. |
| 9,394,672 B2 | | 7/2016 | Judkins et al. |
| 9,617,909 B2 | * | 4/2017 | Styles .............. F02M 35/10393 |
| 2002/0139127 A1 | * | 10/2002 | Kesten ..................... F24F 3/147 62/93 |
| 2005/0048193 A1 | * | 3/2005 | Li ......................... B22F 3/1003 427/2.27 |
| 2011/0168128 A1 | * | 7/2011 | Bradley .............. F02M 25/0222 123/294 |
| 2014/0263060 A1 | | 9/2014 | Summers et al. |
| 2015/0182909 A1 | * | 7/2015 | Glanville ............... B01D 71/10 96/14 |
| 2015/0266750 A1 | | 9/2015 | Abdeen |
| 2016/0107121 A1 | | 4/2016 | Lienhard et al. |
| 2017/0129786 A1 | | 5/2017 | Chen et al. |
| 2017/0292189 A1 | * | 10/2017 | Edwards ................ B01D 69/10 |
| 2018/0141006 A1 | * | 5/2018 | Van Gestel .......... B01D 71/024 |
| 2020/0101420 A1 | | 4/2020 | Jang et al. |

FOREIGN PATENT DOCUMENTS

| | | | | |
|---|---|---|---|---|
| DE | 102015005732 A1 | * | 11/2016 | ......... B01D 67/0041 |
| WO | 2017/002077 A1 | | 1/2017 | |
| WO | 2019/053638 A1 | | 3/2019 | |
| WO | 2019/190762 A1 | | 10/2019 | |

OTHER PUBLICATIONS

International Search Report dated Jul. 31, 2019 dated PCT/US2019/022233.

Guillén-Burrieza et al.: "Experimental analysis of an air gap membrane distillation solar desalination pilot system", Journal of Membrane Science 379 (2011) 386-396.

Walton, N. (1989). Electrical Conductivity and Total Dissolved Solids—what is Their Precise Relationship? Desalination, 72(3), pp. 275-292.

Fath et al.: "PV and thermally driven small-scale, stand-alone solar desalination systems with very low maintenance needs", Desalination 2008, 225, 58-69.

Chang et al.: "Optimization Study of Small-Scale Solar Membrane Distillation Desalination Systems (s-SMDDS)" Int. J. Environ. Res. Public Health 2014, 11, 12064-12087.

Rainmakertm 550http://www.solaqua.com/solstils1.html accessed Oct. 21, 2020.

Carocell 2000 http://www.fcubed.com.au/aspx/carocell-panels.aspx accessed Oct. 21, 2020.

WATERCONE® http://www.watercone.com/product.html accessed Oct. 21, 2020.

Tanvir et al.: "A Novel Solar Thermal Membrane Distillation System for Drinking Water Production in Underdeveloped Areas", 256th American Chemical Society National Meeting & Exposition, Sun, Aug. 19, 2018-Thu, Aug. 23, 2018.

Kumar et al.: "Co-Production Performance Evaluation of a NovelSolar Combi System for Simultaneous Pure Waterand Hot Water Supply in Urban Households of UAE". energies 2017, 10, 481.

Liu Z, et al."Extremely Cost-Effective and Efficient Solar Vapor Generation under Nonconcentrated Illumination Using Thermally Isolated Black Paper". Global Challenges 2017, 1, 1600003.

Echomax, https://www.echomax.co.uk/solar-stills accessed Oct. 21, 2020.

Kascade Solar Water; http://kascade.nl/solar-water/ accessed Oct. 21, 2020.

http://www.gabrielediamanti.com/projects/eliodomestico; accessed Oct. 21, 2020.

Do-Right Solar http://do-right-solar.com/sws200.php accessed Oct. 21, 2020.

https://www.f6s.com/waterfx, accessed Oct. 21, 2020.
https://watly.co/ accessed Oct. 21, 2020.
https://www.saltworkstech.com/ accessed Oct. 21, 2020.
http://www.memsys.eu/ accessed Oct. 21, 2020.
http://www.itn-nanovation.com/ accessed Oct. 21, 2020.
https://www.micronictechnologies.com/, accessed Oct. 21, 2020.
https://solarspring.de/en/home-en/ accessed Dec. 21, 2020.
http://www.watersolutions.ch/ accessed Oct. 21, 2020.
https://www.maximwater.com/ accessed Oct. 21, 2020.

Gleick, P. H., Dirty-water: estimated deaths from water-related diseases 2000-2020. Citeseer: 2002.

"Leenaars et al, The Preparation of Alumina Membranes with Ultrafine Pores, J. Coll Interface Sci, vol. 105, No. 1 May 1985, 27-40."

Leenaars et al, The Preparation and Characterization of Alumina Membranes with Ultra-fine Pores: Part 1 Microstructural investigations on non supported membranes, J. Mat. Sci, 19 (1984) 1077-1088.

Klett et al.: "The role of structure on the thermal properties of graphitic foams", Journal of M aterials Science 39 (2 004) 3659-3676.

Wu et al. (2017) Journal of Materials Chemistry A, 5, 23712-23719.
Said et al. (2019) Industrial and Engineering Chemistry Research, 58, 18829-18835.

Takai et al. (2020) Graphene: Preparations, Properties, Applications, and Prospects, Elsevier, 620 pgs. [Office action cites p. 123].

Y. Ito, Y. Tanabe, J. Han, T. Fujita, K. Tanigaki, M. Chen. "Multifunctional Porous Graphene for High-Efficiency Steam Generation by Heat Localization" Adv. Mater. 27 (2015) 4302-4307.

L. Zhou, Y. Tan, J. Wang, W. Xu, Y. Yuan, W. Cai, S. Zhu, J. Zhu "3D self-assembly of aluminum nanoparticles for plasmon-enhanced solar desalination" Nature Photonics 10 (2016) 393-398.

O. Neumann, A. S. Urban, J. Day, S. Lal, P. Nordlander, N. J. Halas "Solar Vapor Generation Enabled by Nanoparticles" ACS Nano 7 (2013) 42-29.

H. Ghasemi, G. Ni, A. M. Marconnet, J. Loomis, S. Yerci, N. Miljkovic, G. Chen, "Solar steam generation by heat ocalization" Nature Communications 5 (2014) 4449 doi:10.1038/ncomms5449.

X. Li, W. Xu, M. Tang, L. Zhou, B. Zhu, S. Zhu, J. Zhu "Graphene oxide-based efficient and scalable solar desalination under one sun with a confined 2D water path" PNAS 113 (2016) 13953-13958.

L. Eykens, K.D. Sitter, C. Dotremont, L. Pinoy, B.V. d. Druggen, How To Optimize the Membrane Properties for Membrane Distillation: A Review. Ind. Eng. Chem. Res. 55 (2016) 9333-9343.

B.S. Lalia, V. Kochkodan, R. Hashaikeh, N. Hilal, A review on membrane fabrication: structure, properties and performance relationship, Desalination 326 (2013) 77.

Shrivastavava "Desalination Energy Efficiency: Current State of Art and Innovation Opportunities" Oral presentation, Water Desalination Partnership Meeting, Jun. 27, 2016, Lawrence Berkeley National Laboratory.

U.K. Kesieme, N Milne, H. Aral, C. Y. Cheng, M. Duke, Economic analysis of desalination technologies in the context of carbon pricing, and opportunities for membrane distillation, Desalination, 323 (2013) 66-74.

H. Sharon, K.S. Reddy, Renewable and Sustainable Energy Reviews 2015, 41, 1080.

K. Bae, G. Kang, S. K. Cho, W. Park, K. Kim, W. J. Padilla, Nature Communications 2015, 6,10103.

P. Zhang, J. Li, L. Lv, Y. Zhao, L. Qu, ACS Nano 2017, 11, 5087.

H. C. Duong, M. Duke, S. Gray, P. Cooper, L. D. Nghiem, Desalination 2016, 397, 92.

P. D. Dongare, A. Alabastri, S. Pedersen, K. R. Zodrow, N. J. Hogan, O. Neumann, J. Wu, T. Wang, A. Deshmukh, M. Elimelech, Q. Li, P. Nordlander, N J. Halas, PNAS 2017, 114, 6936.

W. Fuqiang, C. Ziming, T. Jianyu, Y. Yuan, S. Yong, L. Linhua, Renewable and Sustainable Energy Reviews 2017, 79, 1314.

J. Klett, Carbon Foams, Cellular Ceramics, Wiley-VCH Verlag GmbH & Co. KGaA2006, pp. 137-157.

J. Klett, R. Hardy, E. Romine, C. Walls, T. Burchell, Carbon 2000, 38(7), 953.

J. Klett, A. McMillan, N. Gallego, C. Walls, Journal of Materials Science 2004, 39(11), 3659.

S. Wang, L. Jiang, Adv. Mater. 2007, 19, 3423.

C. Chen, Y. Li, J. Song, Z. Yang, Y. Kuang, E. Hitz, C. Jia, A. Gong, F. Jian, J. Y. Zhu, B. Yang, J. Xie, and L. Hu, Adv. Water. 2017, 29, 1701756.

H. C. Duong, P. Cooper, B. Nelemans, T. Y. Cath, L. D. Nghiem, Separation and Purification Technology 2016, 166, 55.

Pugsley, A. Zacharopoulos, J. D. Mondol, M. Smyth, Renewable Energy 2016, 88, 200.

Jang et al.: "Efficient Solar-Thermal Distillation Desalination Device by Light Absorptive Carbon Composite Porous Foam", Global Challenges, 2019.

* cited by examiner

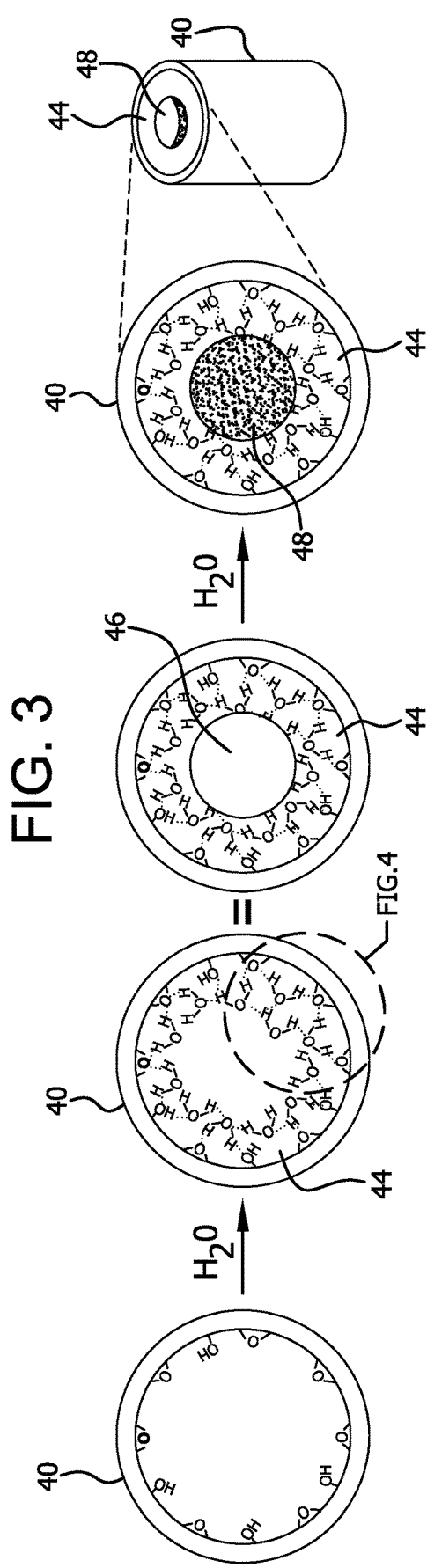

LIGHTWEIGHT INORGANIC MEMBRANE MODULE

CROSS-REFERENCE TO RELATED APPLICATIONS

This application claims priority to U.S. Provisional Application No. 62/774,371 filed on Dec. 3, 2018, entitled "LIGHTWEIGHT INORGANIC MEMBRANE MODULE", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to condensation systems, and more particularly to capillary condensation systems.

BACKGROUND OF THE INVENTION

The availability of potable water and water suitable for agricultural uses is of the utmost concern in many parts of the world. And during military conflicts, the high risk of chemical and biological contamination and/or limited supply in locally available water sometimes requires that a large quantity of water be transported to ensure its suitability for human consumption. The transport of such large amounts of water strains supply and logistical resources. The need to transport water can be significantly reduced if water can be reclaimed and purified from alternate sources, such as any humid gas stream including engine exhaust, waste water from kitchens and showers, and human waste. For example, diesel exhaust typically contains approximately 10% water vapor. During recent conflicts in the Middle East, assuming the use of approximately 12 million gallons of fuel per week, 100% reclamation of water produced from fuel consumption could provide about 12 million gallons of water per week. By employing standard thermodynamic water condensation, only about 50% of the water in exhaust containing 10% water vapor can be condensed at ambient conditions.

The reclamation of potable water from mixed gas streams is described in Judkins et al. U.S. Pat. No. 8,511,072 (Aug. 20, 2013) and Judkins et al U.S. Pat. No. 9,394,672 (Jul. 19, 2016), the disclosures of which are hereby incorporated fully by reference. These patents describe the reclamation of water from mixed gas streams utilizing capillary condensation pores provided on metal supports. The weight of such metal supports, and in some cases also the thermal conductivity, result in structures and systems that can be improved.

SUMMARY OF THE INVENTION

An apparatus for separating a liquid from a mixed gas stream includes a porous graphite foam support comprising graphite foam with pores having a first pore size and a membrane support surface. A porous condensation membrane layer is provided on the membrane support surface of the graphite foam support, and interlocked with the pores of the graphite foam at the membrane support surface. The condensation membrane layer can include capillary condensation pores having a second pore size, the second pore size being less than the first pore size. A mixed gas stream passageway is in fluid communication with the condensation membrane layer. A liquid collection assembly is provided for collecting condensed liquid from the condensation pores and the graphite foam support pores. A gas inlet and a gas outlet are provided for flowing the mixed gas stream into the mixed gas stream passageway and for exhausting gas from the mixed gas stream passageway.

The condensation membrane layer can include sintered particles, where the sintered particles form the condensation pores. The particles can be formed from metals or ceramics. The apparatus can further include an intermediate membrane layer between the condensation membrane layer and the graphite foam. The intermediate membrane layer includes pores having a pore size that is larger than the pore size of the pores of the condensation membrane layer and smaller than the pores of the graphite foam support. The thickness of the condensation membrane layer and if present intermediate layer can be from 1 to 100 µm.

The membrane support surface of the graphite foam support can be provided as channels thorough the graphite foam support, the channels comprising channel walls, the channel walls of the graphite foam support comprising the membrane support surface, the channels comprising the mixed gas stream passageway. The graphite foam of the graphite foam support can have a thermal conductivity of from 40 W/m·K to 240 W/m·K.

The pores of the graphitic foam support can have a pore size of from 25 to 2000 µm. The condensation pores can have a pore size of from 2 to 100 nm. The condensation pores have a pore size of from 6 to 10 nm for water.

The apparatus can further include a collection chamber for collecting liquid from the condensation membrane layer and the graphite foam support, and a liquid pump for removing liquid from the collection chamber. The apparatus can include a vacuum pump for lowering the gas pressure in the collection chamber. The apparatus can further include a cooling assembly for cooling the graphite foam support.

A method for condensing a liquid from a mixed gas stream, can include the step of providing an apparatus for separating a liquid from a mixed gas stream. The apparatus can include a porous graphite foam support comprising graphite foam with pores having a first pore size and a membrane support surface, and a porous condensation membrane layer on the membrane support surface of the graphite foam support, and interlocked with the pores of the graphite foam at the membrane support surface. The condensation membrane layer can include capillary condensation pores having a second pore size, the second pore size being less than the first pore size. The apparatus can further include a mixed gas stream passageway in fluid communication with the condensation membrane layer, a liquid collection assembly for collecting condensed liquid from the condensation pores and the graphite foam support pores, and a gas inlet for flowing the mixed gas stream into the mixed gas stream passageway and a gas outlet for exhausting gas from the mixed gas stream passageway.

A mixed gas stream is flowed through the mixed gas stream passageway. Liquid is condensed in the condensation pores of the condensation membrane layer. The condensed liquid is removed from the condensation pores of the condensation membrane layer, and from the pores of the graphite foam support. The removed liquid can then be collected.

A method of making an apparatus for condensing a liquid from a mixed gas stream can include the step of providing a graphite foam support comprising pores and a membrane support surface in the graphite foam. A condensation membrane layer material having a first, flowable state is applied to the membrane support surface such that the flowable membrane material penetrates pores of the graphite foam at the membrane support surface. The membrane material is heated to change the condensation membrane material from the first, flowable state to a second, rigid state comprising condensation membrane pores, the condensation pores having a pore size that is smaller than the pore size of the pores of the graphite foam. The condensation membrane material interlocks with the pores of the graphite foam at the membrane support surface.

The step of providing a membrane support surface can include forming a channel with channel walls in the graphite foam, the channel walls comprising the membrane support surface. The membrane material can include particles and a binder, and the heating step can include heating the membrane material to a temperature sufficient to remove the binder. The heating step can include heating the particles to a temperature sufficient to sinter the particles. The particles can be formed from a ceramic or metal.

The method can further include the step of applying a intermediate membrane material between the graphite foam and the condensation membrane material. The intermediate membrane material forms pores that are greater in sizer than the pores of the condensation membrane material and less than the pore size of the graphite foam.

The porous graphite foam can have pores having a pore size of from 25 to 2000 μm. The condensation pores can have a pore size of from 2 to 100 nm. The condensation pores can have a pore size of from 6 to 10 nm.

BRIEF DESCRIPTION OF THE DRAWINGS

There are shown in the drawings embodiments that are presently preferred, it being understood that the invention is not limited to the arrangements and instrumentalities shown, wherein:

FIG. 3 is a schematic diagram of a condensation membrane pore and wetting and condensation processes within the pore.

FIG. 4 is an expanded schematic diagram of area FIG. 4 in FIG. 3.

DETAILED DESCRIPTION OF THE INVENTION

Figure 1:
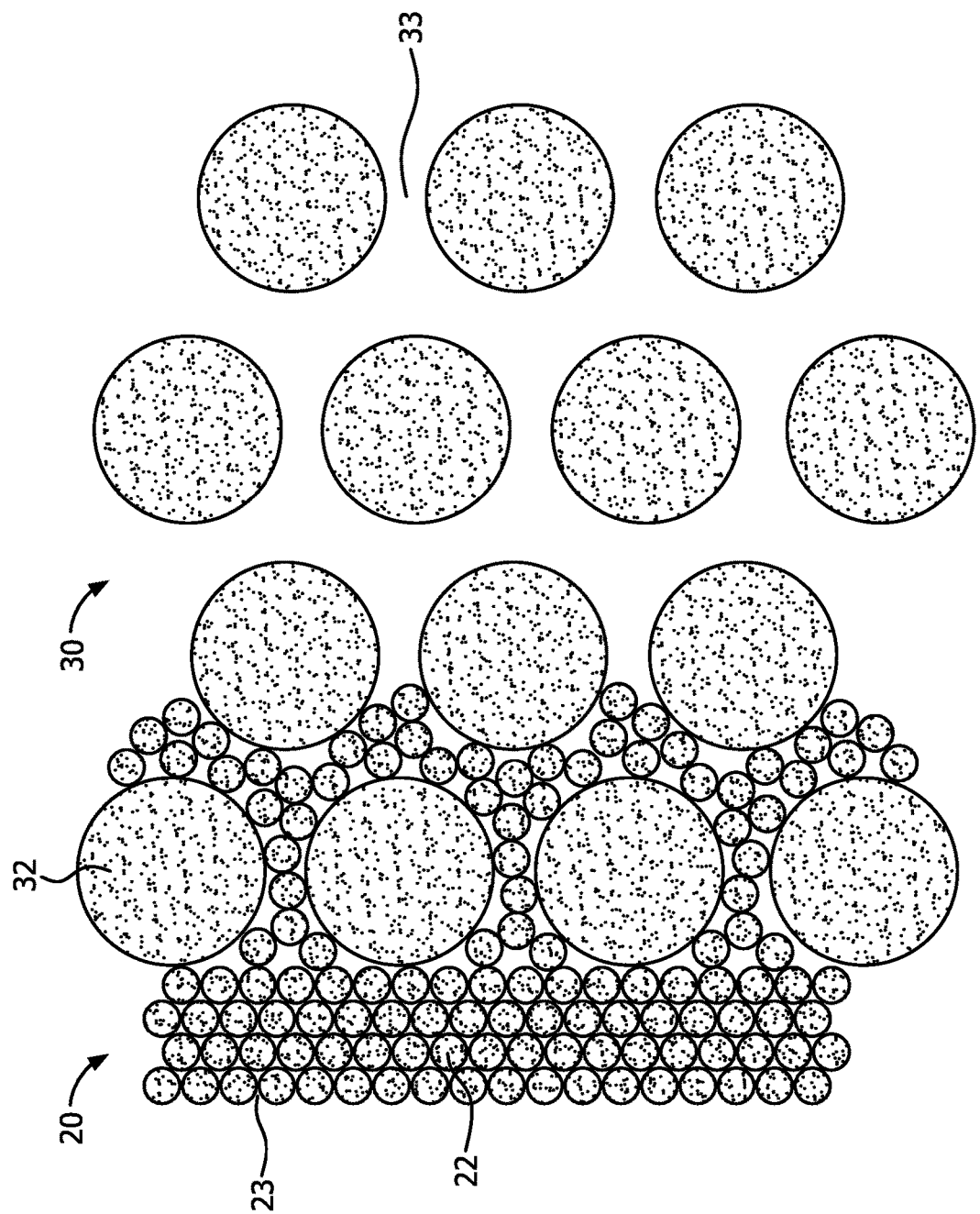
FIG. 1 is a schematic diagram of a condensation membrane layer and interlocked graphite foam support.

An apparatus for separating a liquid from a mixed gas stream includes a porous graphite foam support comprising graphite foam with pores having a first pore size and a membrane support surface. A porous condensation membrane is provided on the membrane support surface of the graphite foam support, and interlocked with the pores of the graphite foam at the membrane support surface. The condensation membrane includes capillary condensation pores having a second pore size. The second pore size is less than the first pore size. A mixed gas stream passageway is in fluid communication with the condensation membrane. A liquid collection assembly can be provided for collecting condensed liquid from the condensation pores and the graphite foam support pores. A gas inlet is provided for flowing the mixed gas stream into the mixed gas stream passageway. A gas outlet is provided for exhausting gas from the mixed gas stream passageway.

The condensation membrane layer can be made by any suitable means and materials to provide the necessary capillary condensation pores and which is capable of penetrating and interlocking with the pores of the graphite foam support. The condensation membrane layer can be made of particles which are adhered together through a chemical or sintering process, the sintered particles forming the condensation pores. The particles can be made of any suitable material. The particles can include metal or ceramic, and combinations of materials.

The apparatus can include an intermediate membrane layer joined between the porous graphite foam support structure and the condensation membrane layer that is interlocked with the graphite foam. The intermediate membrane layer can include pores having a pore size that is smaller than the pore size of the graphite foam but larger than the pores of the condensation membrane. The purpose of an intermediate layer is to bridge the pores of the porous graphite support. For example, if the pores of the graphite support are 5 microns, an intermediate layer may not be necessary. However, if the pores of the porous graphite support are 200 microns, an intermediate layer with a pore size of 2-10 microns might be helpful. Because of the way the layer fills in the outer surface of the layer it is being applied to, the thickness is proportional to the pore size of the underlying layer.

The thickness of the condensation membrane layer or condensation layer and intermediate membrane layer combined can vary. The thickness of the condensation membrane layer or condensation layer and intermediate membrane layer combined can be from 1 to 100 μm. The thickness of the condensation membrane layer can be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 and 100 μm, or within a range of any high value and low value selected from these values.

The graphite foam can be easily machined into different shapes and sizes. The graphite foam can be used to form a graphite foam condensation module with mixed gas stream passageways formed therein. The membrane support surface of the graphite foam support can be provided as the walls of these channels thorough the graphite foam support. The channel walls of the graphite foam support can form all or part of the membrane support surface. The condensation membrane material can be applied to these walls, where it will penetrate the graphite foam. Most commonly the condensation membrane material is applied as a film where a binder is used to control the viscosity of the coating fluid. The condensation membrane material can then be heated to remove binder and to sinter the materials into an interlocking porous structure that is physically constrained in the surface of the graphite foam. The channels through the graphite foam can also serve as all or part of the mixed gas stream passageway.

The pore size of the graphitic foam can vary. The pores of the graphitic foam support can have a pore size of from 25 to 2000 µm. The pores of the graphite foam can have a pore size of 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, and 2000 µm, or within a range of any high value and low value selected from these values.

The pore size of the condensation pores can vary. The condensation pores have a pore size of from 2 to 100 nm. The condensation pores can have a pore size of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 and 100 µm, or within a range of any high value and low value selected from these values. The condensation pores have a preferred pore size for the condensation of water of from 6 to 10 nm.

The graphite foam can be any suitable graphite foam. The graphite foam can have a thermal conductivity of from 40 W/m·K to 240 W/m·K. The porosity of the graphite foam can be from 50 to 90%. Graphite foams are carbon-based materials with high thermal conductivity, good porosity, and are light in weight. Graphite foam articles and methods for manufacturing graphite foams are described in U.S. Pat. No. 6,033,506 "PROCESS FOR MAKING CARBON FOAM"; U.S. Pat. No. 6,037,032 "PITCH-BASED CARBON FOAM HEAT SINK WITH PHASE CHANGE MATERIAL"; U.S. Pat. No. 6,261,485 "PITCH BASED CARBON FOAM AND COMPOSITES"; U.S. Pat. No. 6,287,375 "PITCH BASED FOAM WITH PARTICULATE"; U.S. Pat. No. 6,344,159 "METHOD FOR EXTRUDING PITCH BASED FOAM"; U.S. Pat. No. 6,387,343 "PITCH-BASED CARBON FOAM AND COMPOSITES"; U.S. Pat. No. 6,398,994 "METHOD OF CASTING PITCH BASED FOAM"; U.S. Pat. No. 6,399,149 "PITCH-BASED CARBON FOAM HEAT SINK WITH PHASE CHANGE MATERIAL"; U.S. Pat. No. 6,491,891 "GELCASTING POLYMERIC PRECURSORS FOR PRODUCING NET-SHAPED GRAPHITES"; U.S. Pat. No. 6,656,443 "PITCH BASED CARBON FOAM AND COMPOSITES"; U.S. Pat. No. 6,673,328 "PITCH BASED CARBON FOAM AND COMPOSITES AND USES THEREOF"; U.S. Pat. No. 6,780,505 "PITCH-BASED CARBON FOAM HEAT SINK WITH PHASE CHANGE MATERIAL"; U.S. Pat. No. 6,855,744 "GELCASTING POLYMERIC PRECURSORS FOR PRODUCING NET-SHAPED GRAPHITES"; U.S. Pat. No. 7,070,755 "PITCH-BASED CARBON FOAM AND COMPOSITES AND USE THEREOF"; U.S. Pat. No. 7,456,131 "INCREASED THERMAL CONDUCTIVITY MONOLITHIC ZEOLITE STRUCTURES"; and U.S. Pat. No. 7,670,682 "METHOD AND APPARATUS FOR PRODUCING A CARBON BASED FOAM ARTICLE HAVING A DESIRED THERMAL-CONDUCTIVITY GRADIENT", which are each herein incorporated by reference as if included at length. Graphite foam materials are commercially available from Poco Graphite, Inc., 300 Old Greenwood Road, Decatur, Tex. 76234, and Koppers, LLC, 436 Seventh Avenue, Pittsburgh, Pa. 15219-1800.

A method for condensing a liquid from a mixed gas stream can include the steps of providing an apparatus for separating a liquid from a mixed gas stream which includes a porous graphite foam support comprising graphite foam with pores having a first pore size and a membrane support surface; a porous condensation membrane layer on the membrane support surface of the graphite foam support, and interlocked with the pores of the graphite foam at the membrane support surface. The condensation membrane layer includes capillary condensation pores having a second pore size, where the second pore size is less than the first pore size. A mixed gas stream passageway is in fluid communication with the condensation membrane. A liquid collection assembly can be provided for collecting condensed liquid from the condensation pores and the graphite foam support pores. A gas inlet can be provided for flowing the mixed gas stream into the mixed gas stream passageway and a gas outlet for exhausting gas from the mixed gas stream passageway. A mixed gas stream is flowed through the mixed gas stream passageway. Liquid is condensed in the condensation pores of the condensation membrane. The condensed liquid is removed from the condensation pores of the condensation membrane, and from the pores of the graphite foam support. The removed liquid is then collected in an outer shell structure using a small pump to displace the liquid from the structure.

A method of making an apparatus for condensing a liquid from a mixed gas stream includes the steps of: providing a graphite foam support comprising pores and a membrane support surface in the graphite foam. A condensation membrane material having a first, flowable state is applied to the membrane support surface such that the flowable membrane material penetrates pores of the graphite foam at the membrane support surface. The membrane material is heated to change the membrane material from the first, flowable state to a second, rigid state comprising condensation membrane pores. The condensation pores have a pore size that is smaller than the pore size of the pores of the graphite foam, and the membrane material interlocks with the pores of the graphite foam at the membrane support surface. The interlocking is a physical phenomena wherein the membrane layer material penetrates the tortuous open cells at the surface of the graphite foam, and then is rigidified by suitable means to physically interlock with the graphite foam. Chemical adhesion with the graphite foam can additionally be present in some instances.

The method of making the condensation membrane layer can vary. The membrane material can include particles and a binder, which are applied to the membrane support surface of the graphite foam and penetrate the pores of the graphite foam. Any suitable binder is possible. Methylcellulose and polyethylene glycol are two examples of suitable binders. Other binders are possible. The membrane material can then be heated to a temperature sufficient to remove the binder. The heating step can also include heating the particles to a temperature sufficient to sinter the particles.

The method can further comprise the step of applying at least a intermediate membrane material to the membrane material that is interlocked with the graphite foam to further reduce the pore size of the condensation pores in a graduated fashion. The intermediate membrane material forms pores that are greater in size than the pores of the condensation membrane, and smaller than the pores of the graphite foam. The intermediate membrane material can be interlocked with the graphite foam, and connected to the first condensation layer by suitable means, such as adhesives, sintering, or other means.

The condensation pores condense liquid by a process of capillary condensation. A process for condensing condensable vapor occurs when a meniscus separates a liquid filled pore from the gas phase. The meniscus creates conditions in a pore that lowers the vapor pressure of condensable vapor. The lower vapor pressure allows a greater percentage of water vapor to condense compared to standard condensation under the same conditions. The heat of condensation must be transmitted from membrane for the process to continue efficiently. For example, from a stream containing 10% water 27% of the water would be reclaimed at 40° C. by standard condensation, but 72% would be reclaimed by the capillary condensation process of the invention using 3 nm pores where the membrane layer is controlled at 40° C. A major complication is that the condensation process releases heat that needs to be removed from the membrane to sustain condensation. The graphite provides better heat conduction and reduced weight compared to many other possible support materials, including metals. There is lower fabrication cost and less resistance to water flow.

FIG. 1 is a schematic diagram of a condensation membrane layer and support. The graphite foam support 30 is illustrated schematically as consisting of spheres 32 and pores 33. It will be understood that the graphite foam is an open cell foam material with connected walls and open connected cells defining an irregular fluid flow path through the graphite foam support 30. The condensation membrane layer 20 is provided on the membrane support surface of the graphite foam and in one aspect is comprised of particles 22 that have been deposited on the surface and within the graphite foam pores 33 at this membrane support surface. The particles 22 are adhered together by suitable processes such as sintering. The condensation membrane layer 20 has pores 23 between the particles 22. The pores 23 of the condensation membrane layer 20 have a pore size that is less than the pore size of the pores 33 of the graphite foam support 30.

Figure 2:
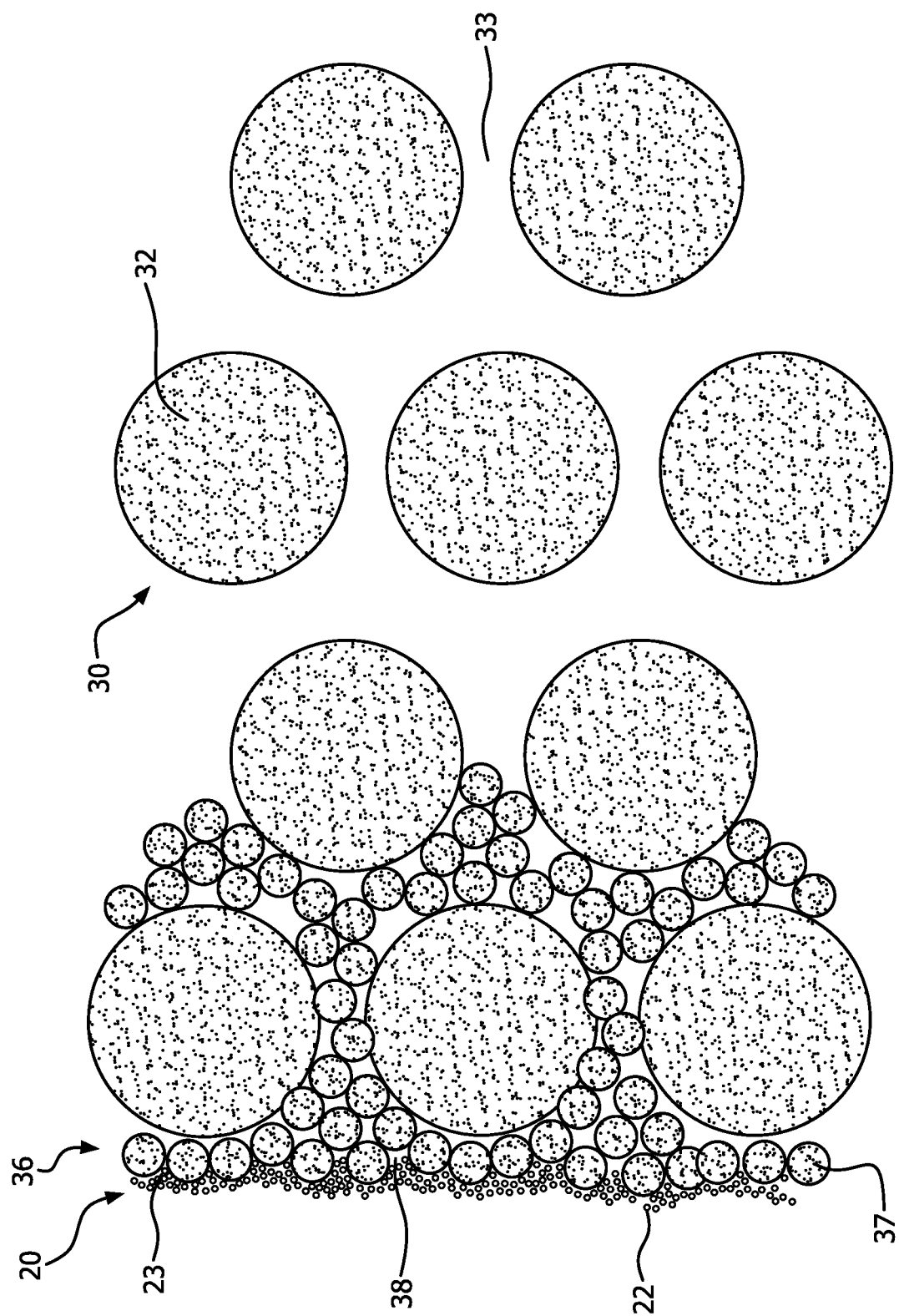
FIG. 2 is a schematic diagram of an alternative condensation membrane layer and interlocked graphite foam support.

FIG. 2 is a schematic diagram of an alternative condensation membrane layer and support. The alternative construction includes an intermediate membrane layer 36 interlocked with the graphite support layer 30. This intermediate membrane layer 36 is comprised of particles 37. The condensation membrane layer 20 is comprised of smaller particles 26 which define pores 23 with a pore size that is less than the pore size of the pores 38 defined by the particles 37 of the intermediate layer 36. The intermediate membrane layer 36 is interlocked with the graphite foam support 30 and joined to the condensation membrane layer 20. In this alternative embodiment, the intermediate membrane layer 36 provided by the larger diameter particles 37 allows for a step down in pore size between the pores of the graphite foam support 30 and the condensation membrane layer 20, or a graduated pore size that increases in the direction of the graphite foam support 30. The final pore size seen by the mixed gas stream can be controlled by the diameter and pore size of the intermediate membrane layer 36 and condensation membrane layer 20. Additional intermediate membrane layers can also be provided if a more graduated pore size is necessary.

FIG. 3 is a schematic diagram of a condensation membrane pore and wetting and condensation processes within the pore. The pores are illustrated schematically by poor wall 40. The initial stages of the capillary condensation process involve the wetting of the pore wall 40 with liquid such as water 44, as by hydrogen bonding. This wetting at the surface of the pore 40 defines an open interior 46 (FIG. 4). As the capillary condensation proceeds, the open interior 46 is filled with liquid water 48. In order for the condensation process to continue, the liquid water 48 in the pores 40 must be removed. Suction such as by pumping of the liquid or vacuum of the gas is utilized to continuously draw the liquid water from the pores 40. This water can then be collected by suitable structure.

Figure 5:
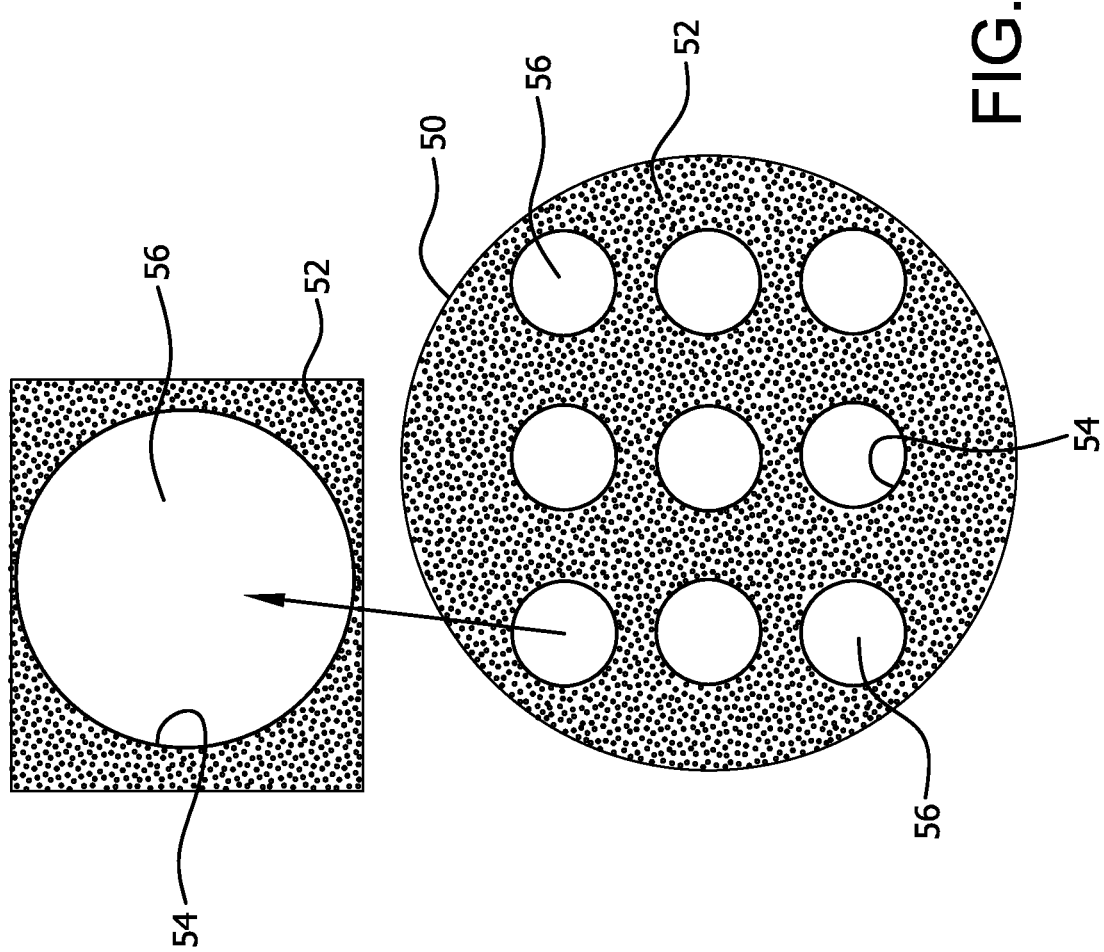
FIG. 5 is a cross sectional diagram and expanded area of a condensation module according to the invention.

FIG. 5 is a cross sectional diagram and expanded area of a condensation module 50 according to the invention. The condensation module 50 can be manufactured entirely or partly of graphite foam. Channels 56 can be formed in the graphite foam module 50. These channels can be coated with a condensation membrane layer 54. The mixed gas stream is caused to flow through the channels 56 where liquid such as water will condense in the condensation pores of the condensation membrane layer 54. This water will be transmitted through the comparatively larger open pores of the graphite foam 50 with reduced resistance to flow.

Figure 6:
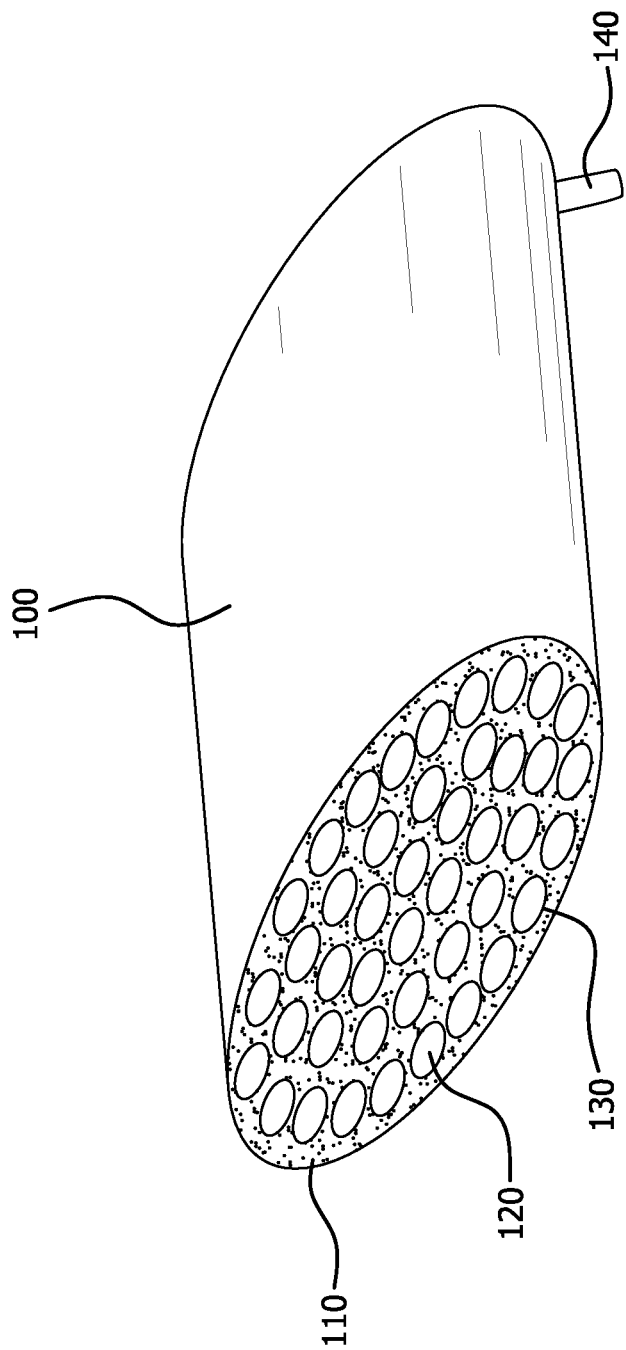
FIG. 6 is a perspective view of a condensation apparatus according to the invention.

FIG. 6 is a perspective view of a condensation apparatus 100 according to the invention which has a condensation module 110 that can be constructed of graphite foam with flow channels 120 and a condensation membrane layer 130. The mixed gas stream is caused to flow through the flow channels 120 of the module 100, and liquid water passing through the pores of the condensation membrane 130 and the open cells of the graphite foam support 110 can exit through a liquid exit 140. Other constructions are possible.

Figure 7:
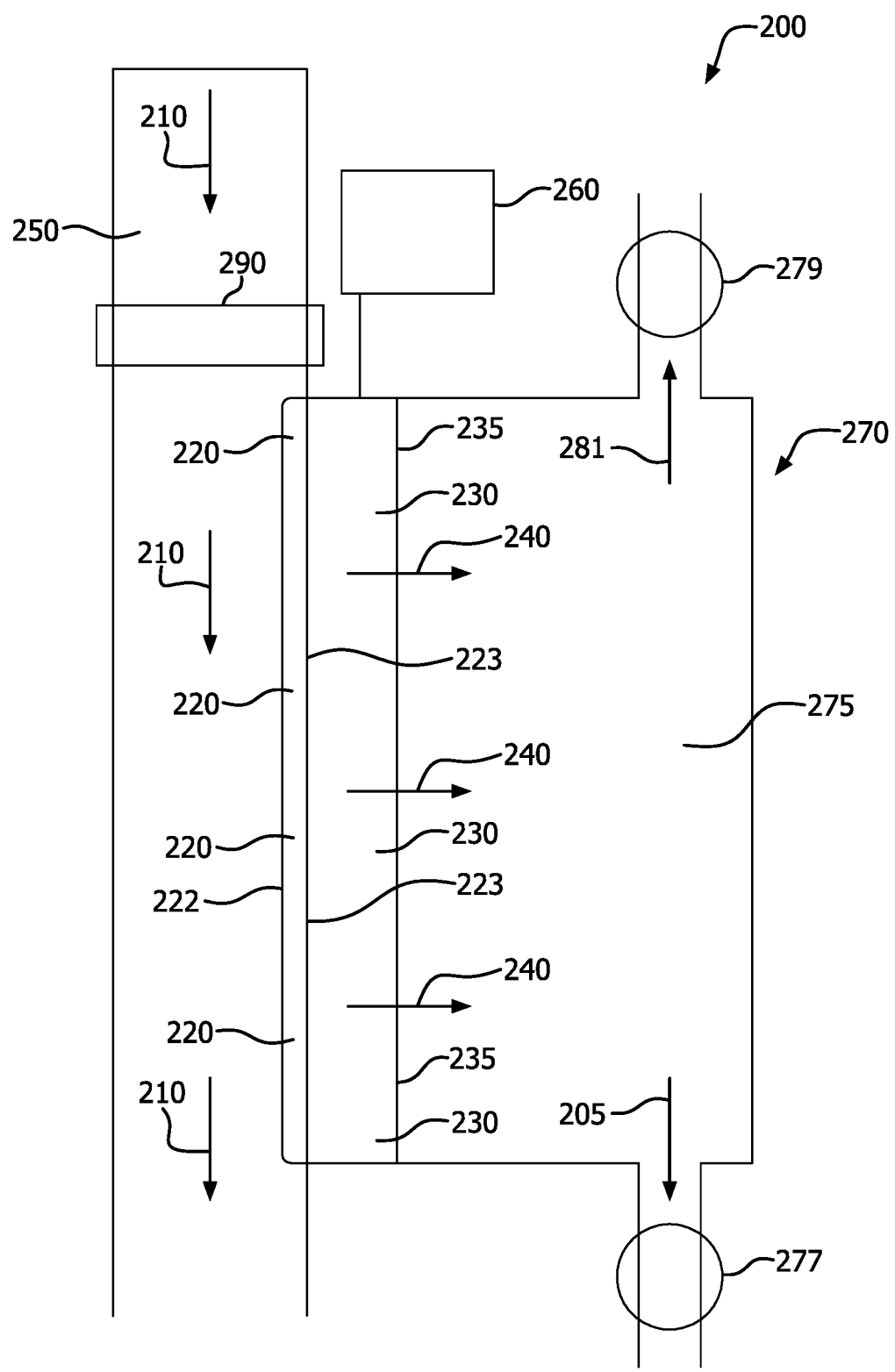
FIG. 7 is a schematic diagram of a condensation system according to the invention.

FIG. 7 is a schematic diagram of a condensation system according to the invention. The apparatus can include a collection chamber for collecting liquid from the condensation membrane and the graphite foam support. A liquid pump can be provided for removing liquid from the collection chamber. Alternatively, a vacuum pump can be utilized for lowering the gas pressure in the collection chamber. FIG. 7 illustrates an embodiment of an apparatus 200 for separating a liquid 205 from a mixed gas stream 210 that can include a porous condensation membrane layer 220, a mixed gas stream passageway 250 and a liquid collection assembly 270. The condensation membrane layer 220 can include an outer surface 222 with capillary condensation pores. The condensation membrane layer 220 is interlocked with the membrane support surface 223 of a graphite foam support 230. Although the pores can be geometrical, it will be appreciated that in most instances the pores will be tortuous and irregular in shape as defined by the porous material making up the condensation layer and as shown in FIGS. 1-2.

The mixed gas stream passageway 250 can be in fluid communication with the capillary condensation pores at the outer surface 222 of the condensation membrane layer 222. The mixed gas stream passageway 250 can be oriented in any suitable position such that at least a portion of a mixed gas stream travelling through the mixed gas stream passageway 250 will contact the capillary condensation pores of the condensation membrane layer 220. For example, a portion of a side wall of the mixed gas stream passageway 250 can include the outer surface 222 of the condensation membrane layer 220, or the condensation membrane layer 220 can be a separate component within or in contact with the mixed gas stream passageway 250. Water or other liquid 240 condensing in the capillary condensation pores of the condensation membrane layer 220 will pass through the graphite support 230 and the outer surface 235 into a suitable collection device or portion.

The liquid collection assembly 270 can be provided for collecting liquid 205 from the pores. As used herein, "liquid collection assembly" refers to any suitable structure or mechanism to collect, discharge or facilitate the removal of liquid that is discharged from the pores. In the embodiment illustrated in FIG. 7, the liquid collection assembly 270 includes a collection chamber 275 for collecting the liquid 240 passing from outer surface 235 of the graphite support 230. The apparatus can also include a liquid pump assembly 277 for removing liquid 205 from the collection chamber 275. The liquid pump assembly 277 can include any suitable structure or mechanism to collect, discharge or facilitate the removal of liquid from the apparatus 200. The liquid pump 277 will generate at least a partial vacuum or pressure difference between the collection chamber 275 and the mixed gas stream passageway 250. The vacuum level between the pressure in the collection chamber 275 and the atmospheric pressure will vary. In one instance, the pressure difference between the mixed gas stream passageway 250 and the collection chamber 275 can be between about 0.1 and 0.5 bar, 1 to 7 psi, or 10 to 50 kPa. Other pressure differences are possible. A vacuum pump 279 can be utilized to exhaust gas 281 from the collection chamber. A processor 260 can be provided to control operation of the system. The pressure difference displaces the liquid from the pores into the collection chamber 275, and so the necessary pressure drop will depend on the construction and operating characteristics of the particular system.

The apparatus can also include a filter assembly 290 positioned upstream of the pore or plurality of pores for filtering out at least a portion of particulates or other contaminants from the mixed gas stream. There are a variety of filters that can be used to collect particles from the mixed gas stream including air filters, electrostatic filters, honeycomb structures, and electrically heatable honeycomb and other structures. Among these, the preferred systems are ceramic honeycomb structures such as those made of corderites when used to purify a source of gases from engine emissions or those made of metals or conducting ceramics, for example silicon nitride doped silicon carbide, which can be resistively heated for stationary sources. The geometry of particulate filters and the channel distribution per square inch depends on the concentration of particles in the gas stream and its space velocity. For example, if the mixed gas stream includes diesel exhaust, the filter assembly can include a diesel particulate filter such as the catalytic particulate filters, including Nox adsorber catalyst and a diesel particulate filters (NAC+DPF), by Johnson Matthey of Malvern, Pa. or the DPX™ catalytic particulate filters by BASF of Iselin, N.J. Other filters and filtration methodologies are also possible.

The apparatus can also include a cooling assembly 260 for cooling the graphite support 230 and thereby also the condensation membrane layer 220. As used herein, "cooling assembly" refers to any suitable mechanism to carry heat away from the apparatus, whether conductive or convective. For example the cooling assembly can include a conventional air-cooling system (e.g., Freon-based compressor, condenser, expansion valve, and evaporator), a circulating water bath, or a fan.

The invention can include monolithic porous graphite structure having channels running the length of the structure. As an example, the structure might be a 6" diameter cylinder 12" long with ½" diameter cylindrical channels running the length of the structure. The structure could be oval, square, rectangular, or any other shape that meets the needs for the application. The channels could also have other shapes instead of cylindrical. A series of 1-3 condensation membrane layers can be applied to the inside surface of the channels to achieve the desired pore size for the separation. Intermediate layers are advantageous if the final condensation membrane layer pore size is much smaller than the porous support. The thickness of the condensation membrane layer is proportional to the pore size of the graphite support structure that is used. If the pore size of the graphite support structure is 50 microns, the thickness of the condensation membrane layer needs to be on the order of 50 microns to fully cover the porous support. For example, a 5 nm membrane could be made by applying an intermediate porous ceramic or metallic layer having a pore size of 0.5 to 5 microns followed by the layer having a pore size of 5 nm. By using an intermediate layer, the final condensation membrane layer would have a thickness ranging from approximately 0.5 to 5 microns versus the 50 micron thick layer that would be required if no intermediate layer were applied.

One such prototype, porous graphite was obtained from several vendors including Koppers, Inc. with a pore size of approximately 100 microns. A single channel was formed in the support for the mixed gas stream passageway. For a more active porous area, multiple parallel channels can be bored down the length of the porous graphite support. A thin condensation membrane layer of porous stainless steel was applied to the inside wall of the channel using a standard slurry technique. The stainless steel had an average particle size of 10 microns and was combined with binder comprising methylcellulose and water. Other binders such as polyethylene glycol could also be used. The slurry can be applied by several techniques including dipcoating. The slurry was poured into the channel and drained, leaving behind a coating of metal particles and binder. After drying, the structure was heat treated under hydrogen at approximately 1030° C. to sinter the metal particles together and burn out the binder. The sintering process creates a structure that forms a mechanical bond of the porous metal with the porous graphite. The resulting porous metal condensation membrane layer had a pore size between 4 and 5 microns. A porous alumina condensation membrane layer was then applied by standard sol-gel processing. The alumina layer was applied to the channel by pouring the sol containing the alumina particles and allowing it to drain. The coating process may be repeated as necessary to obtain the correct layer thickness without defects. The final product was sintered to 600° C. to stabilize and sinter the alumina layer. The final pore size of the alumina layer was 6-8 nm. For this prototype, the stainless steel layer was approximately 50 microns thick while the alumina layer is approximately 5 microns thick.

This lightweight module design offers many advantages over traditional ceramic monoliths and conventional tube and shell designs. First, like traditional honeycomb ceramic modules, there exists a lot of membrane surface area without the need for each individual membrane tube seals at each end. But unlike, a ceramic module, the graphite structure is much lighter. Graphite density is about half of that of alumina (aluminum oxide). The open porosity of the graphite structure is 3-4 times that of a typical porous ceramic. This makes the graphite monolith about 8 times lighter for the same structure. Another advantage is ease of machining. Ceramic monoliths must be formed in their final shape before sintering. The graphite can be easily machined, drilled, and shaped and sized. A first assumption is that a traditional tube and shell design would weigh even less. For tube and shell designs, the void space between tubes has no mass while the graphite has an effective density of 0.27-0.7 g/cc. However, the tube and shell design requires a porous support that would be typically thicker than 500 microns. Compared to the thickness of the porous metal in this prototype, 50 microns, the lightweight graphite structure would still have less mass. And unlike the ceramic honeycomb and graphite monolith, the tube and shell configuration requires each tube to seal at each end. Also, the graphite monolith offers unlimited flexibility for desired monolith shape and channel shape.

While this disclosure describes and enables several examples of an apparatus and a method for maintaining an article at a temperature that is below the ambient air temperature, other examples and applications are contemplated. Accordingly, the invention is intended to embrace those alternatives, modifications, equivalents, and variations as fall within the broad scope of the appended claims. The technology disclosed and claimed herein may be available for licensing in specific fields of use by the assignee of record.

We claim:

1. An apparatus for separating a liquid from a mixed gas stream, comprising:
   a porous graphite foam support comprising graphite foam with pores having a first pore size and a membrane support surface;
   a metal or ceramic porous condensation membrane layer on the membrane support surface of the graphite foam support, and interlocked with the pores of the graphite foam at the membrane support surface, the condensation membrane layer comprising capillary condensation pores having a second pore size, the second pore size being less than the first pore size;
   a mixed gas stream passageway in fluid communication with the condensation membrane layer, the graphite foam support being on one side of the condensation membrane layer and on an opposite side of the condensation membrane layer to the mixed gas stream passageway;
   a liquid collection assembly for collecting condensed liquid from the condensation pores and the graphite foam pores; and,
   a gas inlet for flowing the mixed gas stream into the mixed gas stream passageway and a gas outlet for exhausting gas from the mixed gas stream passageway.

2. The apparatus of claim 1, wherein the condensation membrane layer comprises sintered particles, the sintered particles forming the condensation pores.

3. The apparatus of claim 1, further comprising an intermediate membrane layer between the condensation membrane layer and the graphite foam, the intermediate membrane layer comprising pores having a pore size that is larger than the pore size of the pores of the condensation membrane layer and smaller than the pores of the graphite foam support.

4. The apparatus of claim 1, wherein the thickness of the condensation membrane layer is from 1 to 100 μm.

5. The apparatus of claim 1, wherein the membrane support surface of the graphite foam support is provided as channels thorough the graphite foam support, the channels comprising channel walls, the channel walls of the graphite foam support comprising the membrane support surface, the channels comprising the mixed gas stream passageway.

6. The apparatus of claim 1, wherein the pores of the graphite foam support have a pore size of from 25 to 2000 μm.

7. The apparatus of claim 1, wherein the condensation pores have a pore size of from 2 to 100 nm.

8. The apparatus of claim 1, wherein the condensation pores have a pore size of from 6 to 10 nm.

9. The apparatus of claim 1, wherein the graphite foam of the graphite foam support has a thermal conductivity of from 40 W/m·K to 240 W/m·K.

10. The apparatus of claim 1, further comprising a collection chamber for collecting liquid from the condensation membrane layer and the graphite foam support, and a liquid pump for removing liquid from the collection chamber.

11. The apparatus of claim 1, further comprising a collection chamber for collecting liquid from the condensation membrane layer and the graphite foam support, the collection chamber having a gas pressure, and a vacuum pump for lowering the gas pressure in the collection chamber.

12. The apparatus of claim 1, further comprising a cooling assembly for cooling the graphite foam support.

13. A method for condensing a liquid from a mixed gas stream, comprising the steps of:
   providing an apparatus for separating a liquid from a mixed gas stream, comprising:
      a porous graphite foam support comprising graphite foam with pores having a first pore size and a membrane support surface;
      a metal or ceramic porous condensation membrane layer on the membrane support surface of the graphite foam support, and interlocked with the pores of the graphite foam at the membrane support surface, the condensation membrane layer comprising capillary condensation pores having a second pore size, the second pore size being less than the first pore size;
      a mixed gas stream passageway in fluid communication with the condensation membrane layer, the graphite foam support being on one side of the condensation membrane layer and on an opposite side of the condensation membrane layer to the mixed gas stream passageway;
      a liquid collection assembly for collecting condensed liquid from the condensation pores and the graphite foam pores; and,
      a gas inlet for flowing the mixed gas stream into the mixed gas stream passageway and a gas outlet for exhausting gas from the mixed gas stream passageway;
   flowing a mixed gas stream through the mixed gas stream passageway;
   condensing liquid in the condensation pores of the condensation membrane layer;
   removing the condensed liquid from the condensation pores of the condensation membrane layer, and from the pores of the graphite foam support;
   collecting the removed liquid.

\* \* \* \* \*